(12) United States Patent
Henry

(10) Patent No.: US 7,315,648 B2
(45) Date of Patent: Jan. 1, 2008

(54) DIGITAL SIGNAL CODING WITH DIVISION INTO TILES

(75) Inventor: Felix Henry, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 77 days.

(21) Appl. No.: 11/439,163

(22) Filed: May 24, 2006

(65) Prior Publication Data

US 2006/0210161 A1    Sep. 21, 2006

Related U.S. Application Data

(62) Division of application No. 09/734,920, filed on Dec. 13, 2000, now Pat. No. 7,088,858.

(30) Foreign Application Priority Data

Dec. 17, 1999 (FR) .................. 99 16016
Dec. 17, 1999 (FR) .................. 99 16021

(51) Int. Cl.
*G06K 9/34* (2006.01)

(52) U.S. Cl. .................. 382/173
(58) Field of Classification Search ........ 382/232–253, 382/173, 166, 118; 375/240.01–240.26; 348/420.1–422.1, 572; 345/792, 572; 358/426.01–426.16; 715/760, 839; 711/173

See application file for complete search history.

(56) References Cited

U.S. PATENT DOCUMENTS

| 5,060,285 A | 10/1991 | Dixit et al. ................. 382/253 |
| 5,241,395 A | 8/1993 | Chen ..................... 358/426.14 |
| 5,712,995 A | 1/1998 | Cohn ......................... 345/792 |
| 5,815,168 A | 9/1998 | May ........................... 345/572 |
| 5,949,911 A | 9/1999 | Chui et al. ................... 382/240 |
| 6,005,679 A | 12/1999 | Haneda ..................... 358/453 |
| 6,121,970 A | 9/2000 | Guedalia .................... 715/760 |
| 6,330,653 B1 | 12/2001 | Murray et al. .............. 711/173 |
| 6,404,444 B1 | 6/2002 | Johnston et al. ............ 715/839 |
| 6,501,860 B1 * | 12/2002 | Charrier et al. ............ 382/240 |
| 6,535,644 B1 * | 3/2003 | Kurapati ..................... 382/240 |
| 6,600,830 B1 | 7/2003 | Lin et al. .................... 382/118 |
| 6,661,928 B2 | 12/2003 | Kadono ....................... 382/243 |
| 6,711,297 B1 * | 3/2004 | Chang et al. ............... 382/240 |
| 6,711,299 B2 | 3/2004 | Chao et al. ................. 382/240 |
| 7,088,858 B2 * | 8/2006 | Henry ........................ 382/173 |

OTHER PUBLICATIONS

Nandy S K et al., Dual Quadtree Representation for VLSI Designs:, Proceedings of the Design Automation Conference (DAC), U.S. New York, IEEE, vol. Conf. 23, (Jun. 1, 1986) pp. 663-666.

(Continued)

*Primary Examiner*—Ishrat Sherali
(74) *Attorney, Agent, or Firm*—Fitzpatrick, Cella, Harper & Scinto

(57) ABSTRACT

A method of dividing a digital signal representing physical quantities, including the step of determining an initial partitioning of the signal, displaying representation of the signal and the previously determined signal partitioning, acquiring at least one partitioning modification parameter, and modifying the partitioning of the signal.

18 Claims, 15 Drawing Sheets

OTHER PUBLICATIONS

Figure 1:
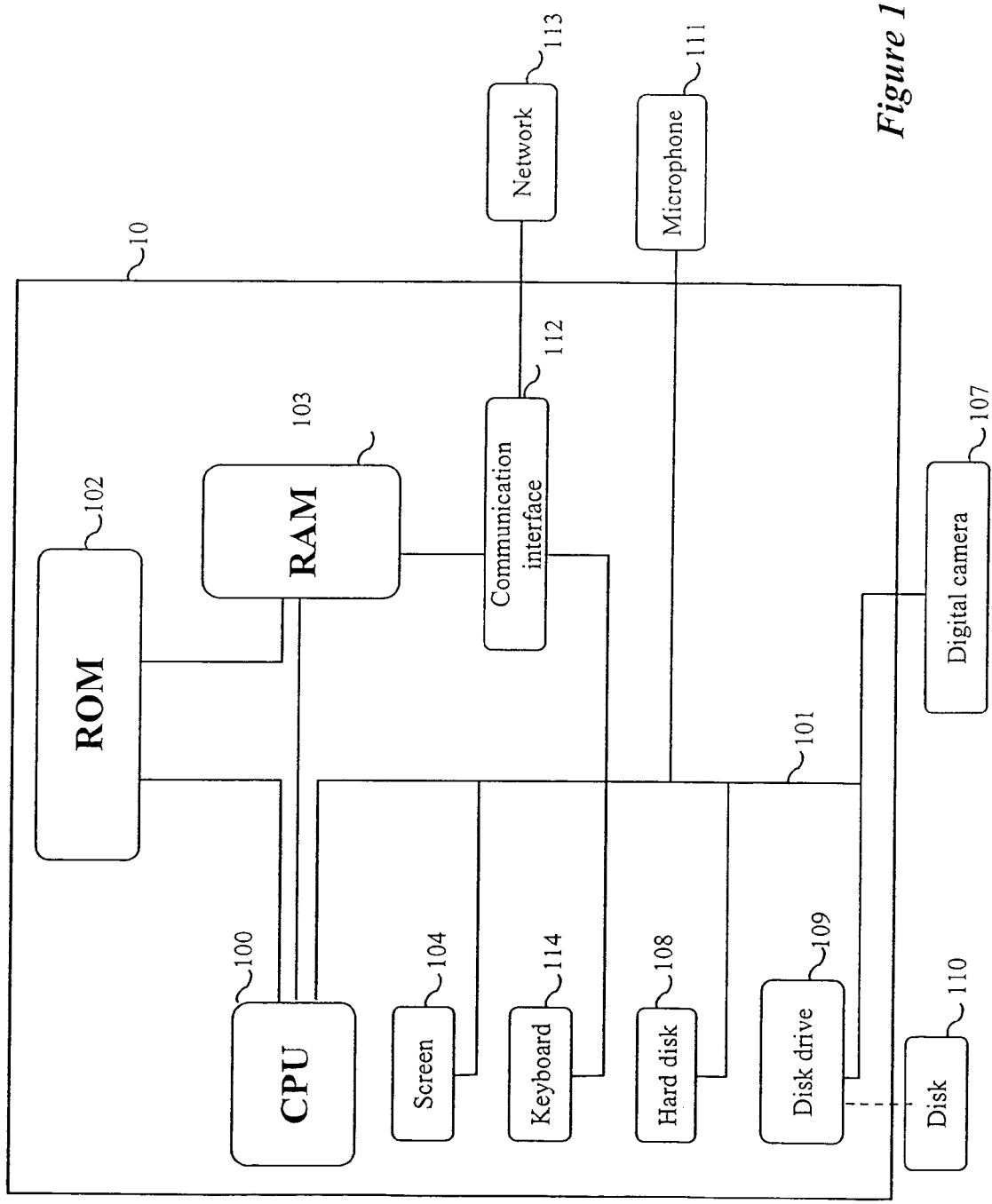

Schoyer M K N et al., "Block Position Dithering in DCT-Coded Sequences", Signal Processing, Image Communication, NL. Elsevier Science Publishers, Amsterdam, vol. 8, No. 6, (Sep. 1, 1996) pp. 545-549.

Munteanu A et al., "Wavelet Image Compression—The Quadtree Coding Approach", IEEE Transactions on Information Technology in Biomedicine, US, IEEE Service Center Piscataway, NJ, vol. 3, No. 3 (Sep. 1999) pp. 176-185.

Smith J R et al., "Frequency and Spatially Adaptive Wavelet Packets", Proceedings of the International Conference on Acoustics, Speech, and Signal Processing (ICASSP), US, New York, IEEE, vol. Conf. 20, (May 9, 1995) pp. 2233-2236.

Stockwell D A: "Display with Partitioned Slow Scroll", IBM Technical Disclosure Bulletin, (Sep. 1980) USA, vol. 23, No. 4, pp. 1512-1513.

Santa Cruz D et al., "Region of Interest Coding in JPEG2000 for Interactive Client/Server Applications", IEEE Workshop on Multimedia Signal Processing. Proceedings of Signal Processing Society Workshop on Multimedia Signal Processing (Sep. 13, 1999) pp. 389-394.

Atsumi E et al., "Loosy/Lossless Region-of-Interest Image Coding Based on Set Partitioning in Hierarchical Trees", Chicago, IL., (Oct. 4-7, 1998) Los Alamitos, CA: IEEE Computer Soc, US, pp. 87-91.

Chun-Tat See et al, "An Adaptive Variable Block Size DCT Transform Coding System", China 1991 International Conference on Circuits and Systems. Conference Proceedings (CAT. No. 91TH0387-1), Shenzhen, China (Jun. 16-17, 1991) pp. 305-308, vol. 1.

Bracamonte J et al: "Adaptive Block-Size Transform Coding for Image Compression" IEEE International Conference on Acoustics, Speech, and Signal Processing (ICASSP), US, Los Alamitos, CA: IEEE Comp. Soc. Press, (Apr. 21, 1997) pp. 2721-2724.

* cited by examiner

DIGITAL SIGNAL CODING WITH DIVISION INTO TILES

RELATED APPLICATION

This application is a divisional of application Ser. No. 09/734,920, filed Dec. 13, 2000, now U.S. Pat. No. 7,088,858, the entire contents of which are incorporated herein by reference.

The present invention in general terms concerns digital signal coding.

The purpose of coding is to compress the signal, which makes it possible to transmit, or respectively store, the digital signal whilst reducing the transmission time or transmission rate, or respectively reducing the memory space used.

The invention is situated in the field of compression of digital signals with loss.

In the particular case of a fixed image signal, the coding technique normally referred to as JPEG (Joint Photographic Expert Group) is very simple to use. This is because, this technique having been designed for coding "natural" images in colours, it proposes a single parameter to be set by the, user, namely the ratio of compression to quality.

New compression techniques have now been developed, such as the one referred to as JPEG2000, in order to meet specific requirements existing within a vast range of applications, such as medical imaging, synthesised images, digital photography or satellite imaging, for example. In order to deal with very different types of image, a large number of adjustment parameters are available, in order to adapt the process to each particular type of application.

Notably, some of these parameters are parameters for partitioning the image into tiles, or sub-images. The use of sub-images makes it possible to reduce the memory space occupied by the data currently being processed during the coding and decoding of an image. In addition, the sub-images allow random access in the file containing the compressed data.

However, the large number of parameters to be set makes the use of such a compression technique complex. In addition, the user-chooses the partitioning into tiles without knowing where the tile limits will be situated compared with the semantic content of the image.

The document U.S. Pat. No. 5,815,168 offers the possibility of modifying the shape of tiles in an image according to the display mode or other display factors.

The present invention aims to remedy the drawbacks of the prior art by providing a method and device for dividing a digital signal, according to which the setting of the parameters for division into tiles is simplified.

In general terms, the invention concerns a method of dividing a digital signal representing physical quantities, characterised in that it includes the steps of:
  displaying a representation of the signal,
  acquiring at least one parameter for a partitioning of the signal,
  displaying the representation of the signal and of the partitioning of the signal corresponding to said at least one previously acquired parameter.

To this end, the invention proposes a method of dividing a digital signal representing physical quantities, characterised in that it includes the steps of:
  determining an initial partitioning of the signal,
  displaying a representation of the signal and the previously determined signal partitioning,
  acquiring at least one partitioning modification parameter,
  modifying the partitioning of the signal.

By virtue of the invention, the setting of the parameters for division into tiles is very simple, since the signal and the partitioning of the latter into tiles are displayed, which enables a user to display the partitioning and the modification thereof.

According to a preferred characteristic, the partitioning of the signal includes blocks of samples of the signal, and said at least one modification parameter is chosen from amongst a block height and a block width.

This implementation is simple and fast.

According to another preferred characteristic, which can be combined with the previous one, said at least one modification parameter makes it possible to translate the partitioning with respect to the signal.

Thus the size of the tiles, or blocks, is not modified, only their limits are moved.

According to a preferred characteristic, the modified partitioning of the signal is selected from a predetermined set of partitionings.

According to a preferred characteristic, the invention also includes the step of simulating the coding an decoding of the signal and the displayed representation of the signal is the result of the step of simulating.

According to a preferred characteristic, distortions in the representation of the signal are emphasized.

The user can see the distortions due to the coding and decoding of the signal, those distortions being possibly emphasized. Thus, the user can take into account the distortions in order to modify the setting of the parameters for division into tiles.

The invention also concerns a method of coding a digital signal representing physical quantities, which includes the division method presented above.

The coding method has advantages similar to those previously disclosed.

Correlatively, the invention proposes a device for dividing a digital signal representing physical quantities, characterised in that it has:
  means of determining an initial partitioning of the signal,
  means of displaying a representation of the signal and of the previously determined signal partitioning,
  means of acquiring at least one partitioning modification parameter,
  means of modifying the partitioning of the signal.

In another aspect, the invention aims to provide a method and a device for dividing a digital signal, according to which the setting of the parameters for division into tiles is adapted to the semantic content of the signal.

To this end, the invention proposes a method of dividing a digital signal representing physical quantities, characterised in that it includes the steps of:
  determining at least one area of interest in the signal,
  determining an initial partitioning of the signal, including partitioning areas,
  modifying the partition of the signal according to said at least one area of interest and a predetermined criterion.

Thus the setting of the parameters for dividing into tiles is adapted to the semantic content of the signal, since the area or areas of interest are taken into account during the formation of the partitioning of the signal.

According to a preferred characteristic, the partitioning of the signal is modified so that said at least one area of interest is not divided into two partitioning areas.

Thus an area of interest is situated entirely within a partitioning area, and consequently will be processed on a single occasion, for example during the coding and decoding of the signal. In addition, any discontinuities which may exist at the boundaries of the partitioning areas do not affect the areas of interest.

According to another preferred characteristic, the partitioning of the signal is modified so that the partitioning areas are the smallest possible in order to satisfy the predetermined criteria.

Thus the number of partitioning areas is as large as possible, having regard to taking the areas of interest into account. The memory size necessary for processing each partitioning area is thus reduced.

According to a preferred characteristic, the partitioning of the signal includes blocks of samples of the signal, and the modification of the partitioning includes the modification of at least one parameter chosen from amongst a block height and block width.

This implementation of the invention is simple and fast.

According to another preferred characteristic, which can be combined with the previous one, the modification of the partitioning includes a translation of the partitioning with respect to the signal.

Thus the size of the partitioning areas is not modified, their limits are merely moved so that the areas of interest are not shared between two partitioning areas.

According to a preferred characteristic, the modification of the partitioning results in a modified partitioning which is selected from a predetermined set of partitionings.

The invention also concerns a method of coding a digital signal representing physical quantities, characterised in that it includes the previously disclosed division method.

The coding method has advantages similar to those previously disclosed.

The invention also concerns a device for dividing a digital signal representing physical quantities, characterised in that it has:
  means of determining at least one area of interest in the signal,
  means of determining an initial partitioning of the signal, including partitioning areas,
  means of modifying the partitioning of the signal according to said at least one area of interest and a predetermined criterion.

The invention also relates to a coding device which includes the division device previously disclosed.

These devices have means adapted to implement the above characteristics.

The invention also concerns a digital apparatus including the division or coding device, or means of implementing the division or coding method. The advantages of the device and of the digital apparatus are identical to those previously disclosed.

The invention also concerns an information storage means, which can be read by a computer or a microprocessor, integrated or not into the device, possibly removable, storing a program implementing the division or coding method.

Figure 2:
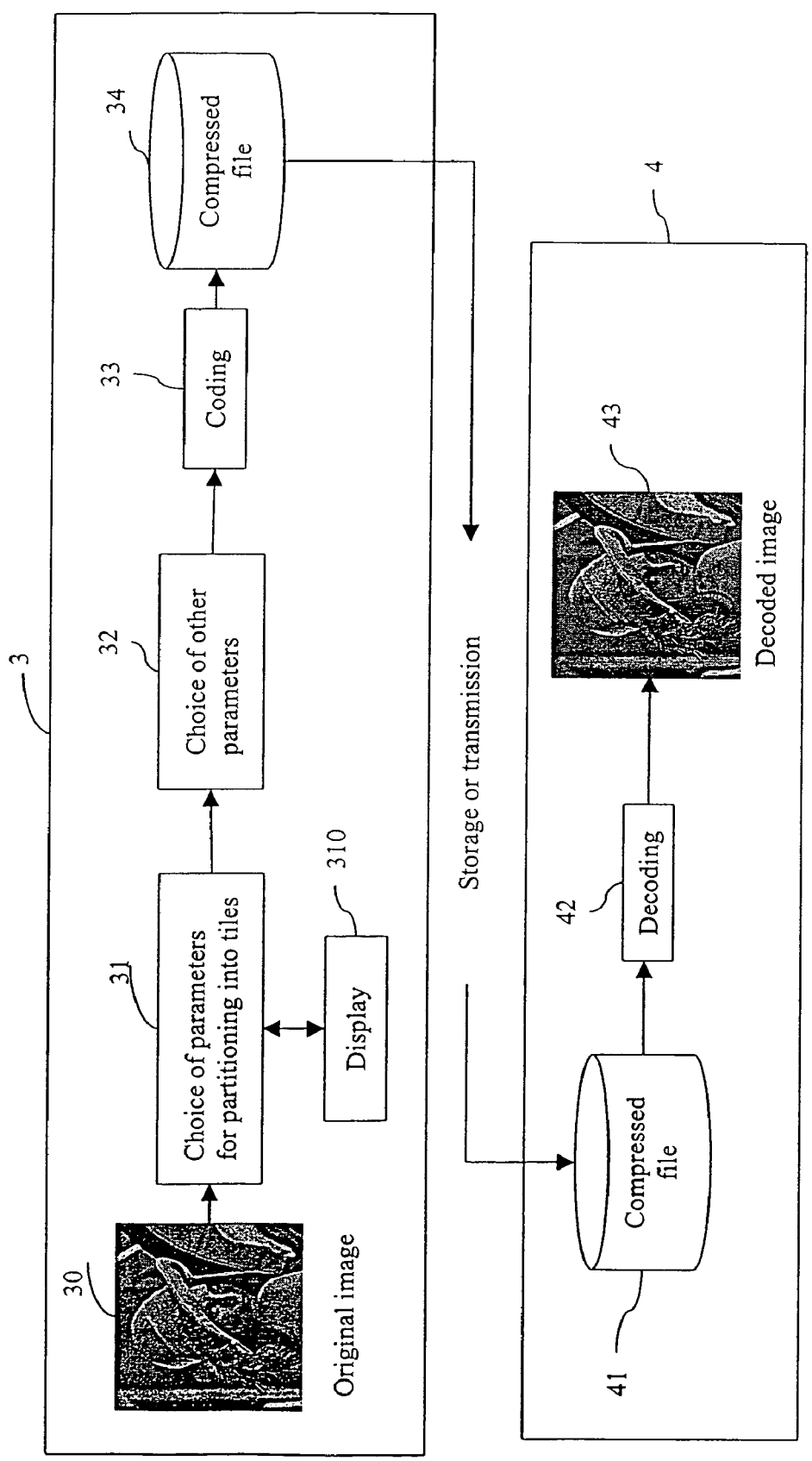
Figure 3:
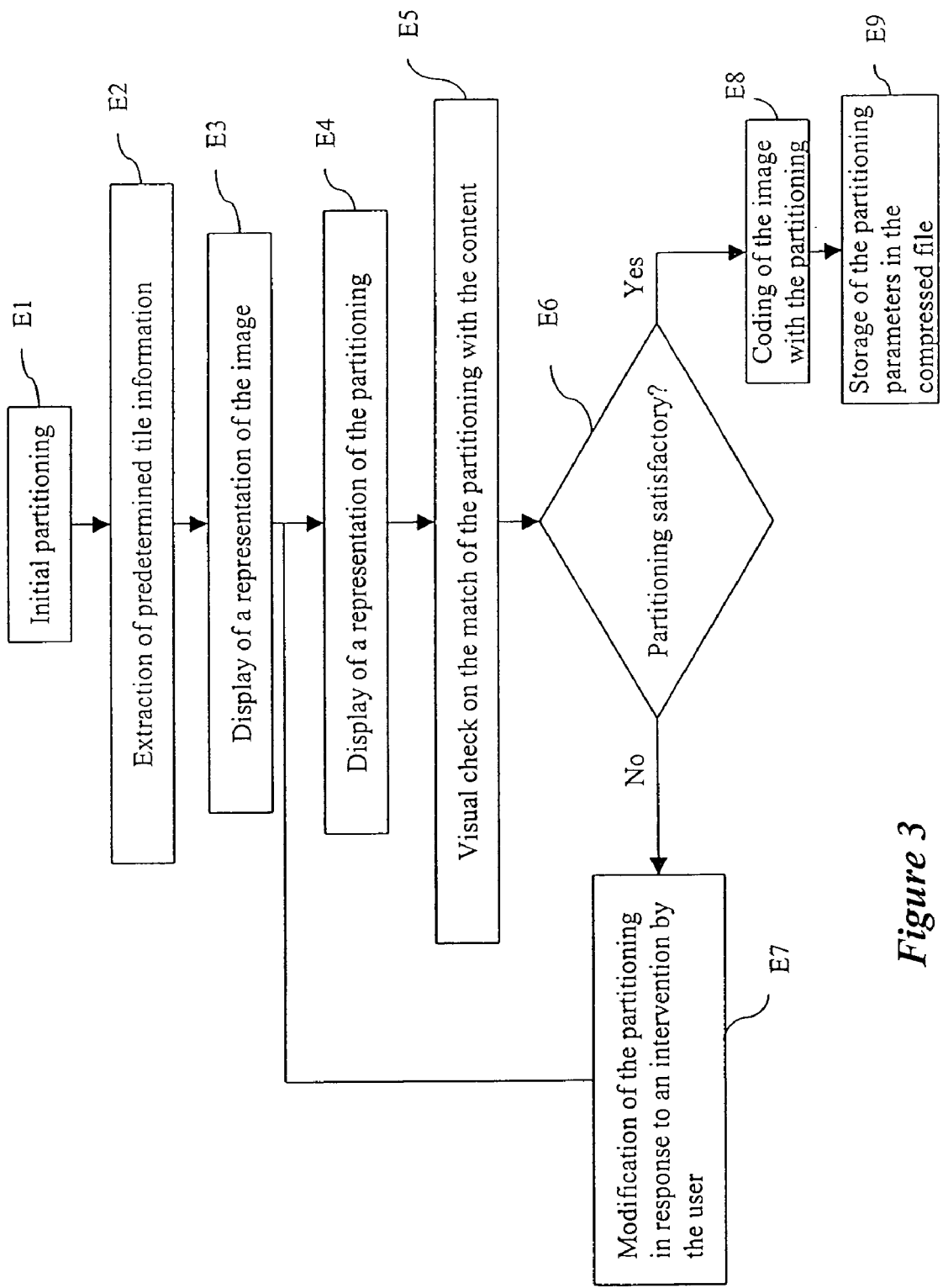
Figure 4:
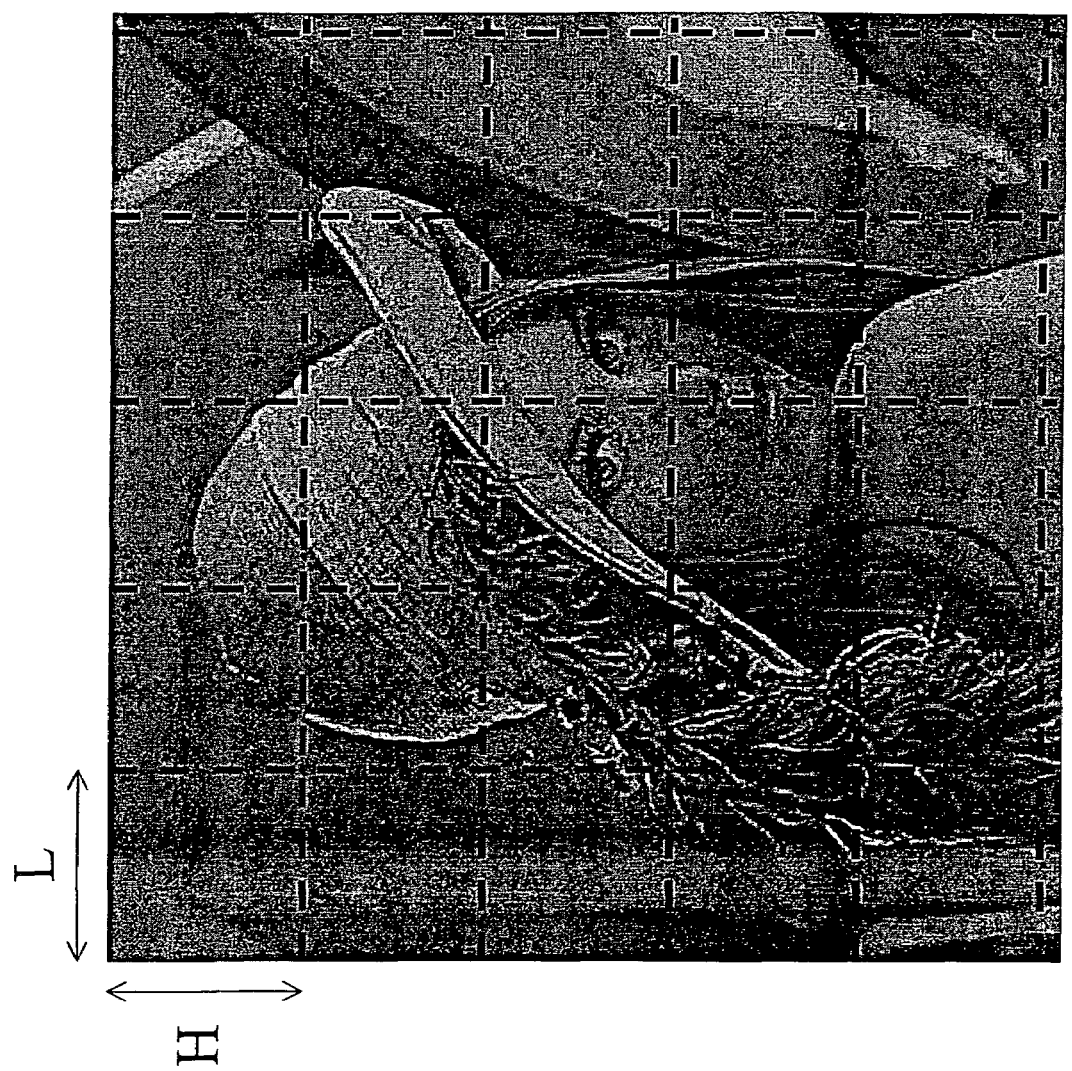
Figure 5:
Figure 6:
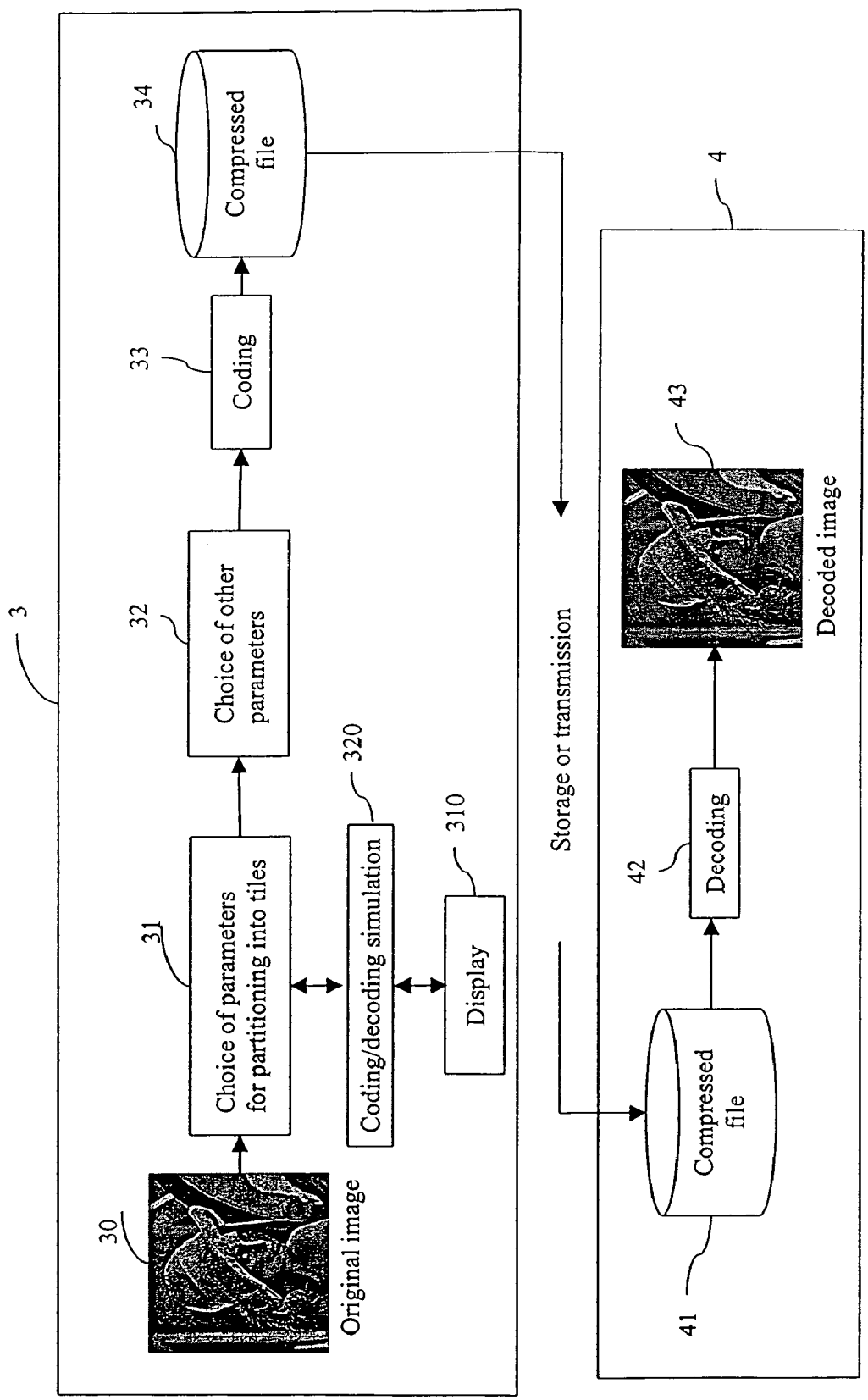
Figure 7:
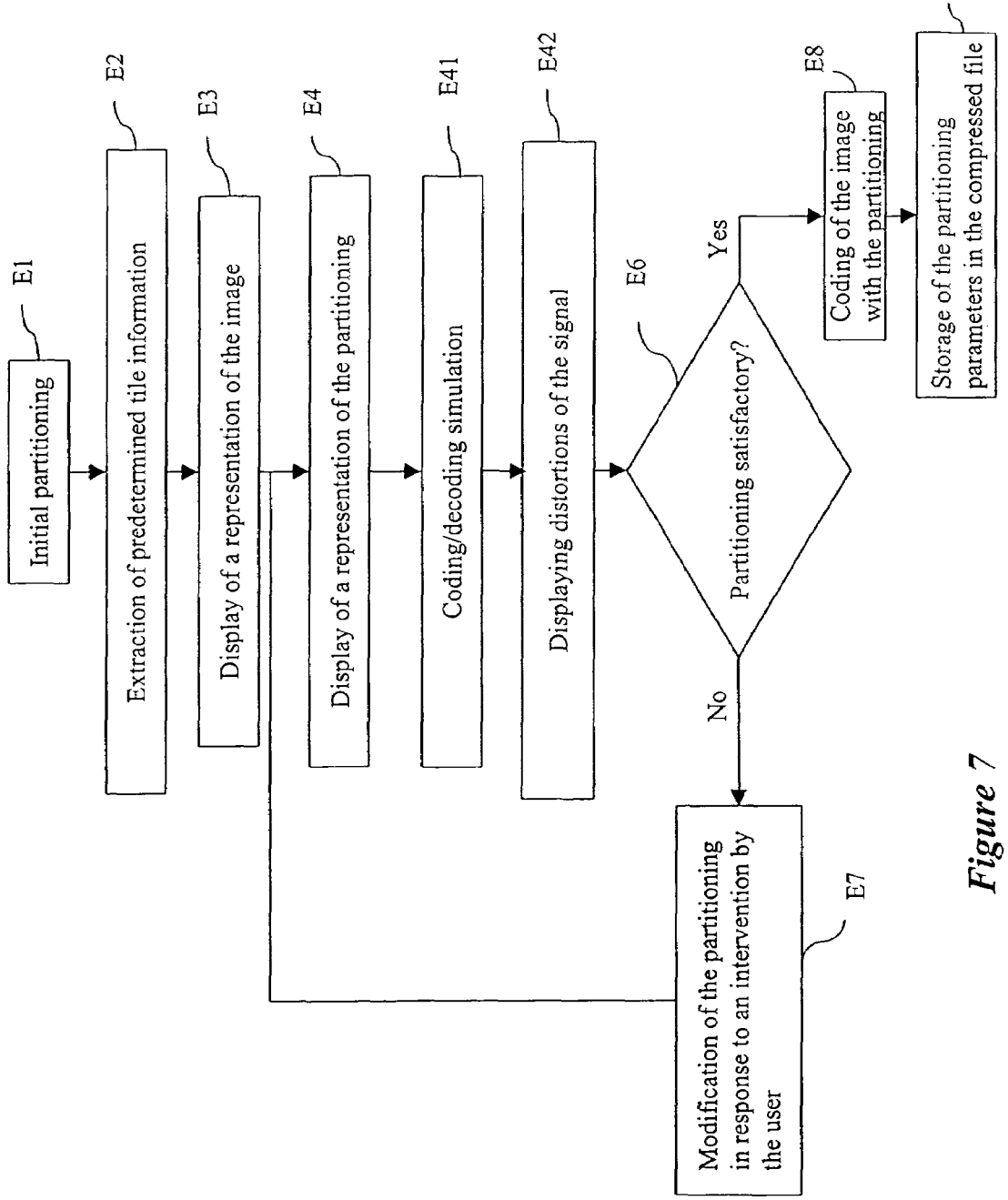
Figure 8:
Figure 9B:
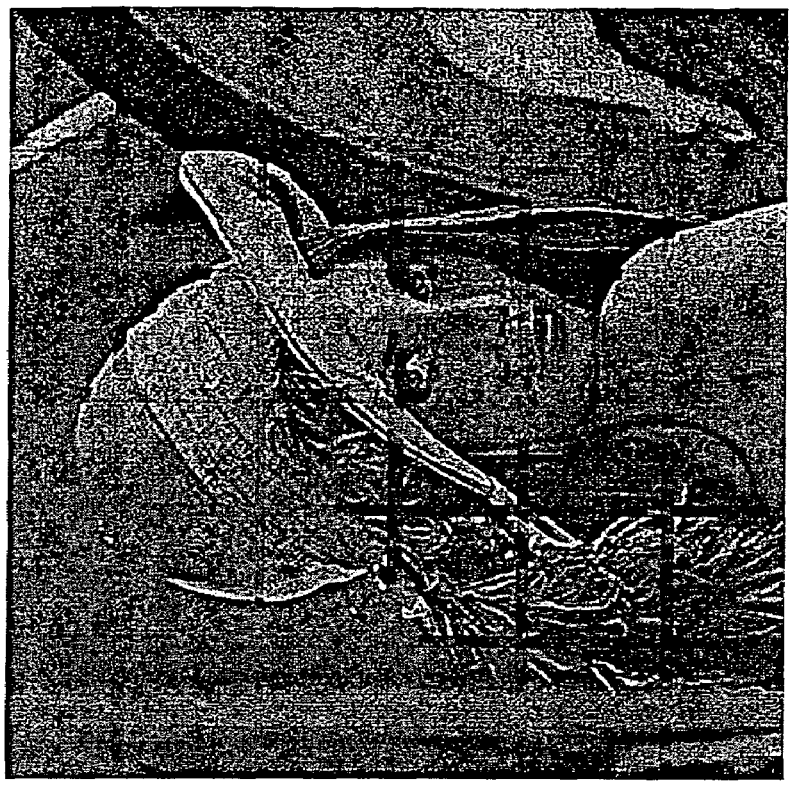
Figure 9A:
Figure 10:
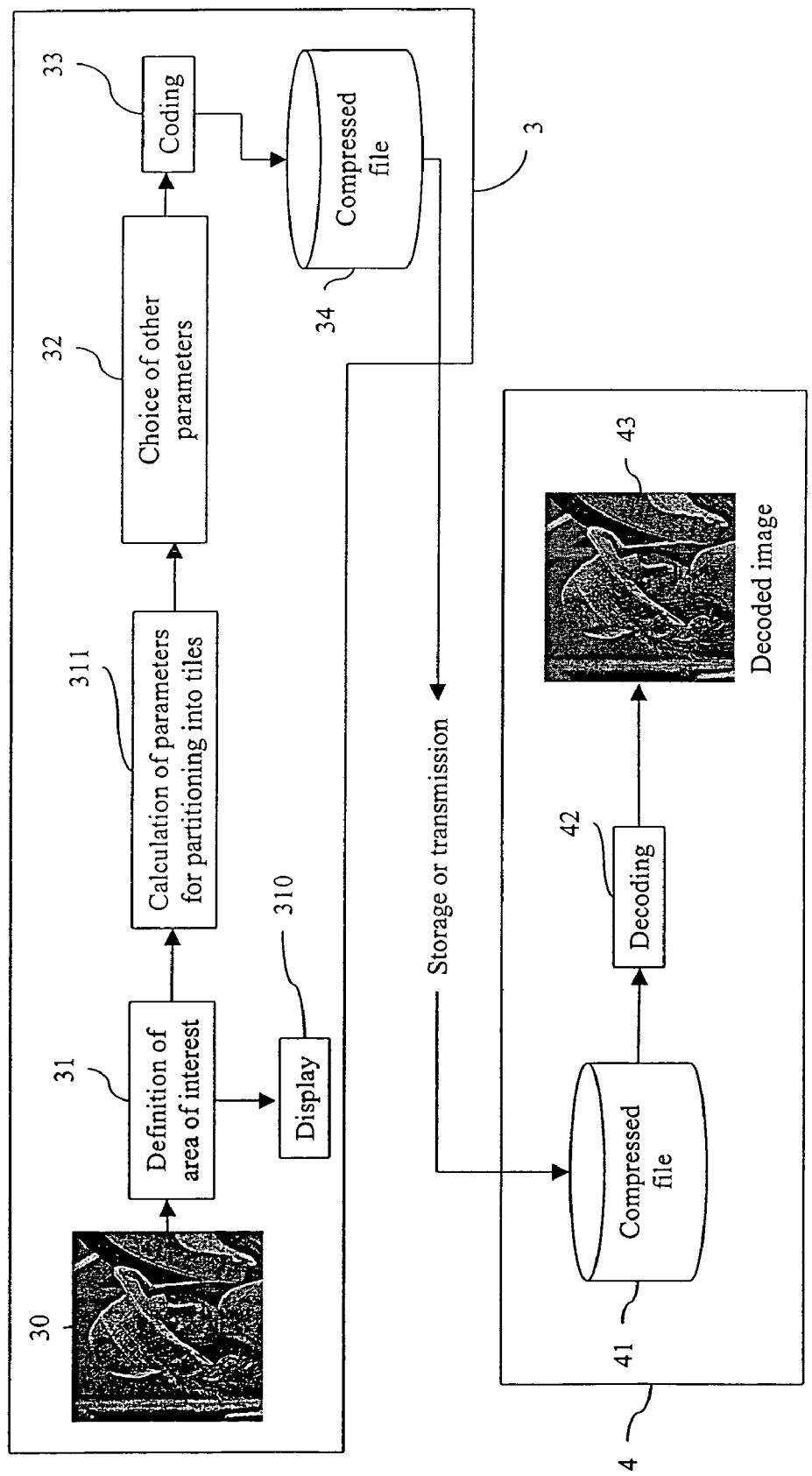
Figure 11:
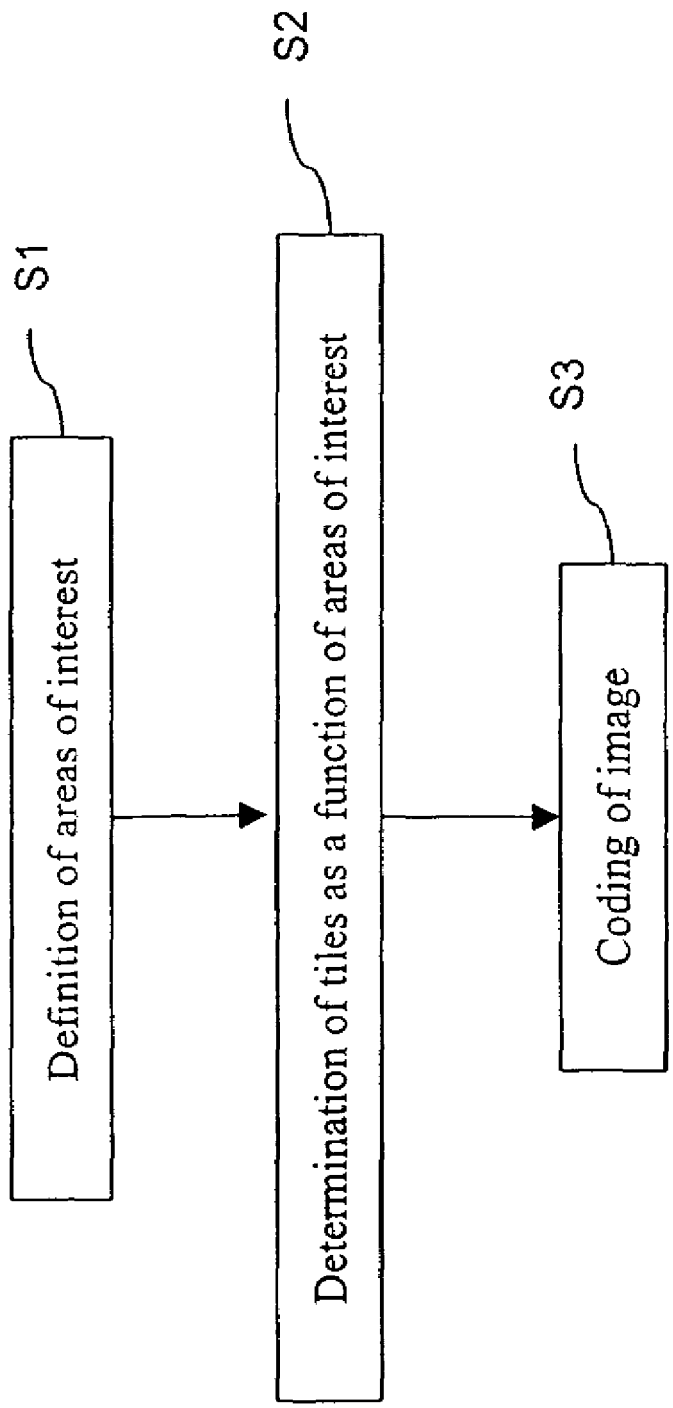
Figure 12:
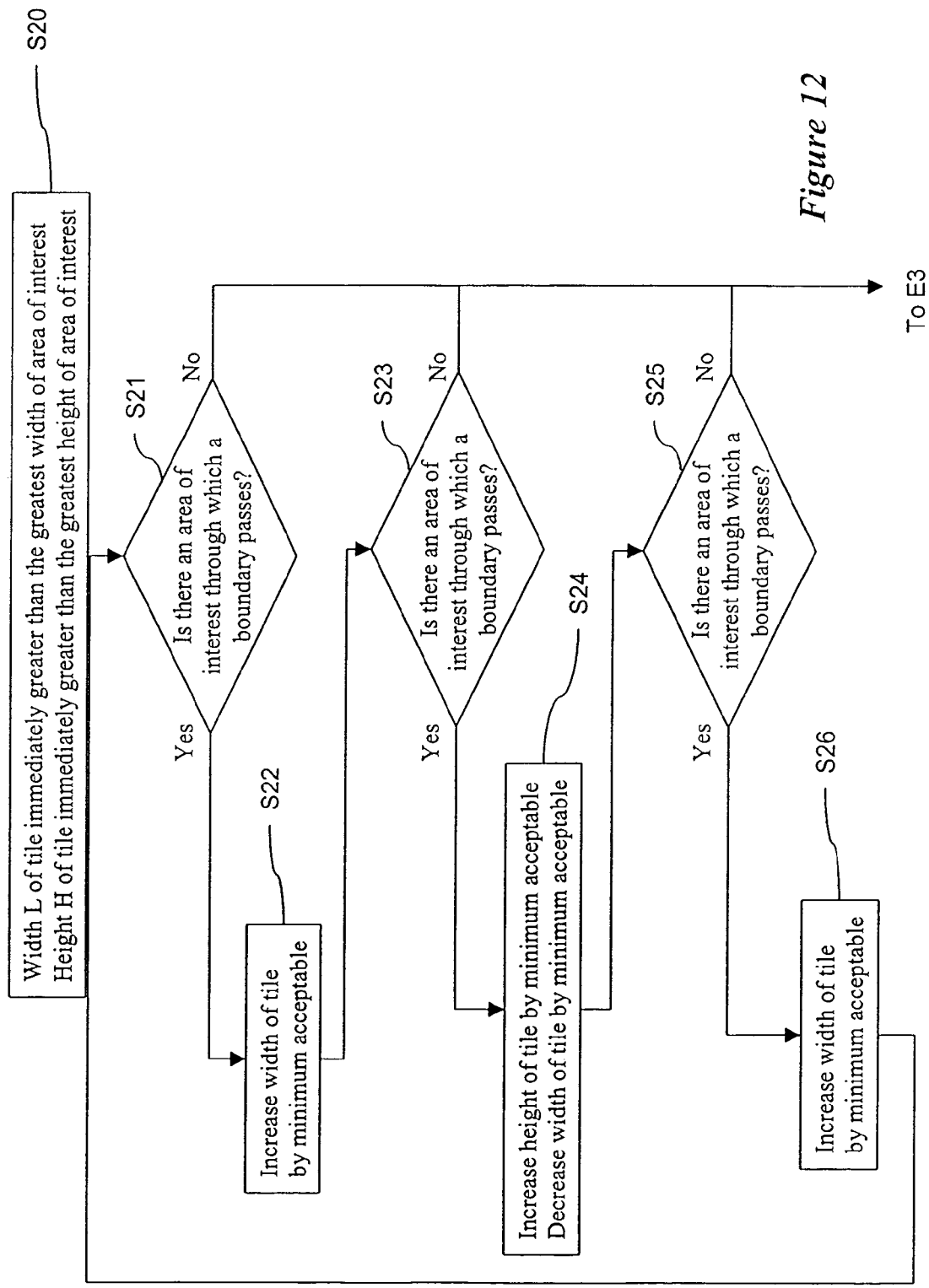
Figure 13:
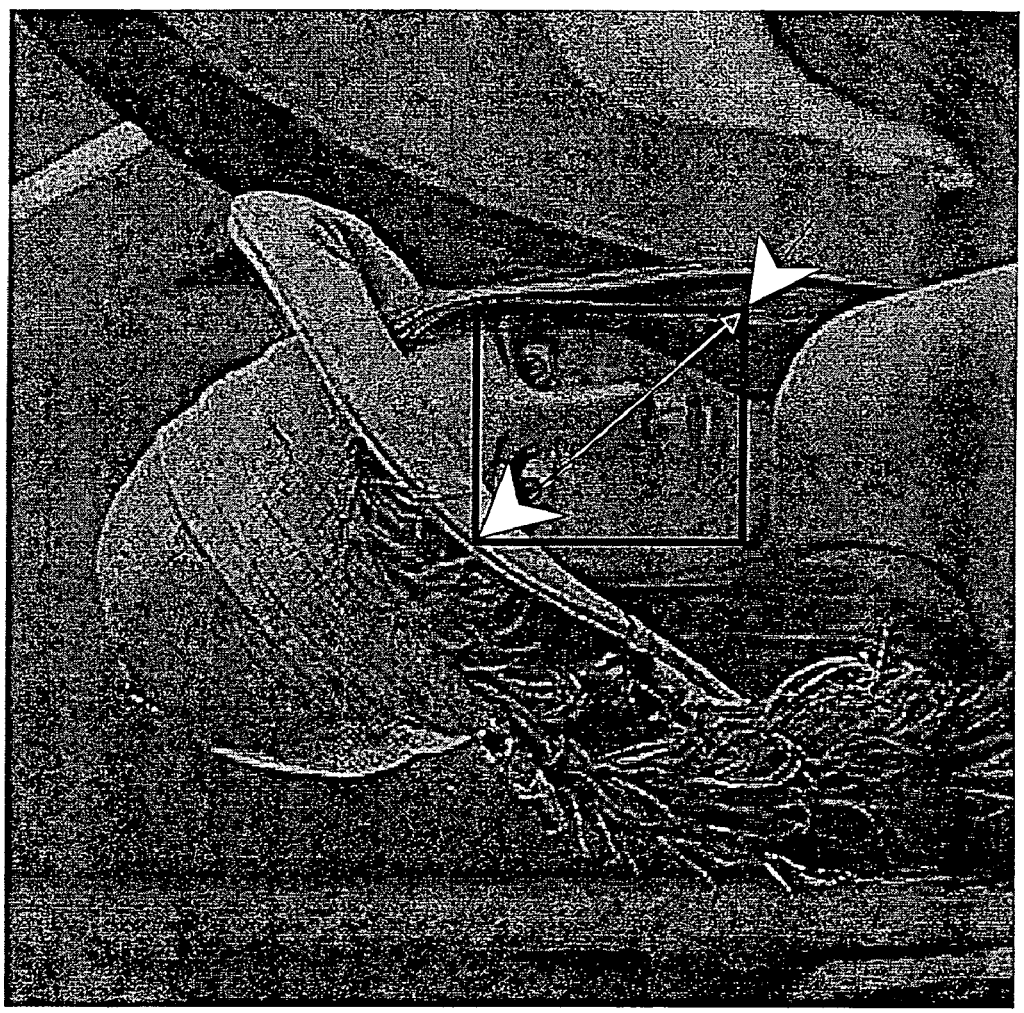
Figure 14:
Figure 15:
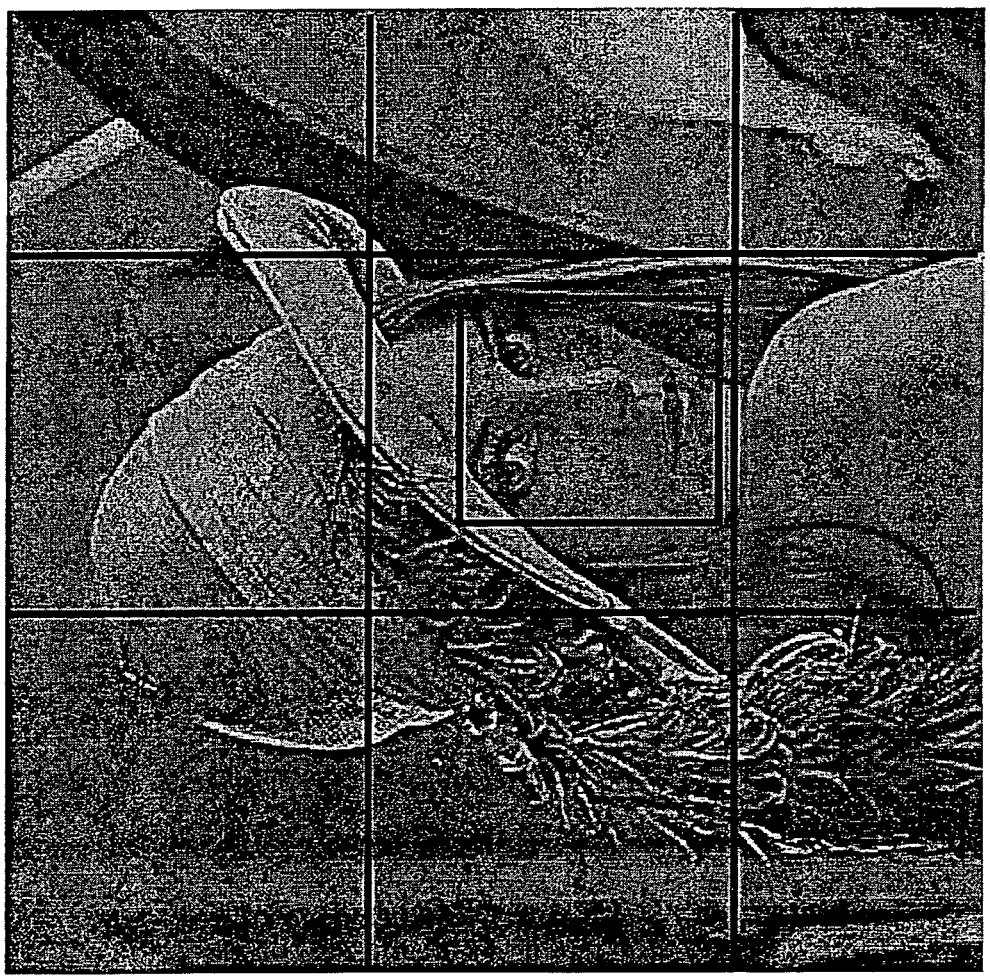

The characteristics and advantages of the present invention will emerge more clearly from a reading of a preferred embodiment illustrated by the accompanying drawings, in which:

FIG. 1 is an embodiment of a device implementing the invention,

FIG. 2 depicts a coding device according to a first embodiment of the invention and a corresponding decoding device, FIG. 3 is a first embodiment of the coding method according to the invention, FIG. 4 is a representation of an image and a partitioning thereof, FIG. 5 is a representation of an image and a partitioning thereof, FIG. 6 depicts a coding device according to a second embodiment of the invention and a corresponding decoding device, FIG. 7 is a second embodiment of the coding method according to the invention, FIG. 8 is a representation of an image processed according to the second embodiment, FIGS. 9a and 9b are representations of an image processed according to a third embodiment, FIG. 10 depicts a coding device according to a fourth embodiment of the invention and a corresponding decoding device, FIG. 11 is a fourth embodiment of the coding method according to the invention, FIG. 12 is an embodiment of a method of determining the partitioning of the image, included in the coding method of FIG. 11, FIG. 13 is a representation of an image and an area of interest therein, FIG. 14 is a representation of an image and a partitioning thereof, FIG. 15 is a representation of an image and a partitioning thereof.

According to the chosen embodiment depicted in FIG. 1, a device implementing the invention is for example a microcomputer 10 connected to different peripherals, for example a digital camera 107 (or a scanner, or any means of acquiring or storing an image) connected to a graphics card and supplying information to be processed according to the invention.

The device 10 has a communication interface 112 connected to a network 113 able to transmit digital data to be processed or conversely to transmit data processed by the device. The device 10 also has a storage means 108 such as for example a hard disk. It also has a drive 109 for a disk 110. This disk 110 can be a diskette, a CD-ROM or a DVD-ROM, for example. The disk 110, like the disk 108, can contain data processed according to the invention as well as the program or programs implementing the invention which, once read by the device 10, will be stored on the hard disk 108. According to a variant, the program enabling the device to implement the invention can be stored in the read only memory 102 (referred to as ROM in the drawing). In a second variant, the program can be received in order to be stored in a manner identical to that described previously by means of the communication network 113.

The device 10 is connected to a microphone 111. The data to be processed according to the invention will in this case be from the audio signal.

This same device has a screen 104 for displaying the data to be processed or serving as an interface with the user, who can thus parameterise certain processing modes, using the keyboard 114 or any other means (a mouse, for example).

The central unit 100 (referred to as CPU in the drawing) executes the instructions relating to the implementation of the invention, instructions stored in the read only memory 102 or in the other storage elements. During powering up, the processing programs stored in a non-volatile memory, for example the ROM 102, are transferred into the random access memory RAM 103, which will then contain the executable code of the invention as well as the registers for storing the variables necessary for implementing the invention.

In more general terms, an information storage means, which can be read by a computer or by a microprocessor, integrated or not into the device, possibly removable, stores a program implementing the method according to the invention.

The communication bus 101 affords communication between the different elements included in the microcomputer 10 or connected to it. The representation of the bus 101 is not limitative and notably the central unit 100 is capable of communicating instructions to any element of the microcomputer 10 directly or by means of another element of the microcomputer 10.

Several embodiments of the invention will be detailed in the following.

With reference to FIG. 2, a first embodiment of a coding device 3 according to the invention is intended to code a digital signal for the purpose of compressing it. The coding device is integrated into an apparatus, which is for example a digital photographic apparatus, or a digital camcorder, or a database management system, or a computer.

The device according to the invention has a signal source 30, here an image signal IM, whether a fixed image or an image sequence. In general terms, the signal source either contains the digital signal, and has for example a memory, a hard disk or a CD-ROM, or converts an analogue signal into a digital signal, and is for example an analogue camcorder associated with an analogue to digital converter. The image source 30 generates a series of digital samples representing an image IM. The image signal IM is a series of digital words, for example bytes. Each byte value represents a pixel of the image IM, here with 256 grey levels or in colour.

An output of the signal source 30 is connected to a circuit 31 for selecting parameters for partitioning the image into tiles, or blocks. A tile is a set of samples of the image, for example forming a rectangle. The tiles are adjacent. The present invention concerns particularly the selection of parameters for partitioning the image into tiles.

The circuit 31 is connected to an image and partitioning display circuit 310, which enables a user to display the result of the partitioning.

The circuit 31 makes it possible to determine an initial partitioning of the signal, which will be displayed by the circuit 310, just like the image.

The circuit 31 next makes it possible to acquire at least one partitioning modification parameter, and to modify the partitioning of the signal accordingly.

The circuit 31 is connected to a circuit 32 for selecting other parameters. These parameters include notably a required compression ratio, a type of wavelet decomposition, a number of decomposition levels, and a coding with or without loss. These parameters are selected by the user via an interface, or are read in a memory in which they were previously stored.

It should be noted that, in an equivalent manner, the circuit 32 can be arranged in front of the circuit 31.

The circuit 32 is connected to a coding circuit 33, which effects a coding, known per se, of the partitioned image. For example, the coding used is in accordance with the standard JPEG2000 (Joint Photographic Expert Group), currently being produced, in which the digital signal can be decomposed into tiles, each tile being a sub-image. The coding includes a quantisation and an entropic coding such as an arithmetic coding or a Huffman coding.

The coding circuit 33 is connected to a coded data processing circuit 34, which stores and/or transmits the compressed file containing the coded image to a decoding device 4.

The decoding device 4 has a coded data reception circuit 41. The circuit 41 is connected to a decoding circuit 42, which performs operations which are the reverse of those of the coding circuit 33. The decoding circuit 42 is connected to a circuit 43 for using the decoded data, for example in order to display a decoded image.

FIG. 3 depicts a first embodiment of a method of dividing and coding an image, according to the invention. This method is implemented in the coding device (FIG. 2) and includes steps E1 to E9.

The method is implemented in the form of an algorithm which can be stored in whole or in part in any information storage means capable of cooperating with the microprocessor. This storage means can be read by a computer or by a microprocessor. This storage means is integrated or not into the device, and may be removable. For example, it may have a magnetic tape, a diskette or a CD-ROM (fixed-memory compact disc).

In general terms, the method includes the steps of:
  displaying a representation of the image,
  acquiring at least one parameter of a partitioning of the image,
  displaying the representation of the image and the partitioning of the image corresponding to said at least one previously acquired parameter.

Step E1 is the initial partitioning of an image to be coded. The image is divided into rectangular tiles, with the same predetermined size. The width L and height H of a tile are here integer powers of two. It should be noted that other constraints on the size or shape of the tiles are possible in the context of the invention.

The initial values of the parameters L and H are predetermined, or in a variant are calculated with respect to the image, for example with respect to the size of the image. Thus an image can be divided systematically into four tiles.

As depicted in FIG. 4, the tiles are positioned on the image in accordance with a regular structure. The tiles are positioned as from the top left-hand corner of the image, which then corresponds to the top left-hand corner of a tile.

When the size of the image does not exactly correspond to a whole number of tiles, the tiles on the right-hand and bottom edges of the image are truncated. Such a partitioning of the image is described by the two parameters L and H, which are respectively the width and height of a tile. In an equivalent fashion, the partitioning can be described by two other parameters which represent the parameters L and H. Thus, since the parameters L and H are integer powers of two, the partitioning can be represented by $\log_2 (L)$ and $\log_2 (H)$.

Naturally, the partitioning can be effected with tiles of different shapes, or different sizes. For example, it can result from a quadtree decomposition.

The following step E2 is the extraction of the representation of the partitioning effected at the previous step. In the example chosen, the parameters L and H are extracted from a memory in which they are stored.

The following step E3 is the display of a representation of the image. This representation is preferably the image itself, or can be a modified version of the image, for example a sub-image extracted from the original image, or a reduced version of the original image, or an enlarged version of the image.

The following step E4 is the display of a representation of the partitioning, in correspondence with the displayed image. As depicted in FIG. 4, the limits between tiles are depicted by lines, here dotted lines. Naturally, if a reduced version of the image is displayed, then the representation of the partitioning is reduced in an identical manner.

The following step E5 is a visual check on the match of the partitioning with the content of the image. This is followed by step E6, which is a test for determining whether the current partitioning is satisfactory, according to the semantic content of the image.

If the response is negative, then this step is followed by step E7, which enables the user to modify the partitioning. Different means can be used so that the user indicates the modifications which he desires. For example, as depicted in FIG. 5, symbols SB1 and SB2, such as arrows, are superimposed on the partitioning. These symbols can be repositioned by the user, by means of the mouse or commands entered by means of the keyboard. The effect of the repositioning of the symbols SB1 and SB2 is to reposition the tile limits. The tile sizes can be chosen from a predetermined set of sizes. Thus, for example, the tile limits are positioned at predefined positions such that the height and width of the tiles remain integer powers of two.

Modification of the partitioning can also be a translation of the partitioning with respect to the image. Naturally it is possible to effect these two modifications in a combined fashion, that is to say to modify the tile size and to translate the partitioning.

Step E7 is followed by the previously described step E4.

When the response is positive at step E6, then this step is followed by the step E8 of coding the image using the current partitioning. The coding includes a quantisation and entropic coding of the samples of the image. The coded data of the image are stored in a compressed file, in which the parameters L and H for partitioning the image are also stored at step E9.

FIG. 6 depicts a second embodiment of the invention. The device of FIG. 6 is similar to the device of FIG. 2 and includes the same circuits. It also includes an additional circuit 320 for simulating the coding and decoding of the image. The circuit 320 is connected between the circuits 31 and 310.

This embodiment allows to display the expected distortions along the edges of the image. As a matter of fact, instead of displaying the original image and the location of the frontiers of the blocks in the partition, the device displays the expected decoded image.

Thus, the user can visually control that the distortions along the edges do not interfere with the important image content.

For this purpose, the simulating circuit 320 simulates the encoding and decoding of the image, in order to obtain the decoded image.

To perform this simulation, it is possible to completely encode and then completely decode the image. As a variant it is possible to simulate encoding/decoding by performing all stages of image compression until quantization, and then dequantizing the signal and performing reverse stages.

FIG. 7 depicts a second embodiment of a method according to the invention. This method is implemented in the coding device (FIG. 6).

This embodiment includes the previously described steps E1 to E9. It also includes steps E41 and E42 between steps E4 and E5.

Step E41 is the simulation of the encoding and decoding of the image.

Step E42 is the display of the distortion to be expected in the image for a given image partition.

FIG. 8 represents the image together with the distortions along the edges of the image partition. This is what the user sees at step E42 in the second embodiment.

FIGS. 9a and 9b depict a third embodiment of the invention. According to this embodiment, the possibility is given to the user to emphasize the distortions due to the partition of the image. This emphasis allows the user to better identify the distortions and their interaction with the image content.

FIG. 9a represents the image with its distortions, and FIG. 9b represents the same image where the distortions have been artificially emphasized. Distortions emphasis can be achieved by a number of methods. For instance, a high pass filtering can be applied along the edges of the image. Typical examples of high-pass filtering are given in <<Fundamentals of Digital Image Processing>>, A. K. JAIN, Prentice-Hall International Editions, 1989. Another possibility to emphasize the distortion along the edges would be to equalize the signal along the said edges. Equalization techniques are also described in the same reference.

With reference to FIG. 10, a fourth embodiment of a coding device 3 according to the invention is similar to the device described with reference to FIG. 2. Only circuits 31 and 311 are specific to this embodiment. The other circuits will not be described.

The signal source 30 is connected to the circuit 31 which defines at least one area of interest in the image. The circuit 31 is connected to an image display circuit 310. As depicted in FIG. 13, a representation of an area of interest is superimposed on the image display. The representation of the area of interest includes for example symbols which can be moved by a user by means of a mouse, for example, so as to position the areas of interest and to define their respective size. In the example in FIG. 15, a single rectangular area of interest is depicted, but the number and shape of the areas may be different.

The circuit 31 is connected to a circuit 311 for calculating the 1parameters for partitioning into tiles. A tile is a set of samples in the image, for example forming a rectangle. The tiles are adjacent. As detailed below, the partitioning into tiles depends on the areas of interest previously defined.

The circuit 311 is connected to the circuit 32 for selecting other parameters. It should be noted that, in an-equivalent manner, the circuit 32 can be arranged in front of the circuit 311.

FIG. 11 depicts a fourth embodiment of a method of dividing and coding an image, according to the invention. This method is implemented in the coding device (FIG. 10) and includes steps S1 to S3.

The method is implemented in the form of an algorithm which can be stored in whole or in part in any information storage means capable of cooperating with the microprocessor. This storage means can be read by a computer or by a microprocessor. This storage means is integrated or not into the device, and may be removable. For example, it may have a magnetic tape, a diskette or a CD-ROM (fixed-memory compact disc).

Step S1 is the definition of the areas of interest. For example, at this step, the user is offered the possibility of defining the position, shape and size of each of the areas of interest which he chooses in the image. As depicted in FIG. 13, the user defines at least one area of interest by means of two symbols, here arrows, which he moves on the image in order to designate two opposite corners of a rectangle, for example by means of the mouse. When the rectangle does indeed correspond to the area of interest, the user validates his choice, and step S1 is followed by step S2.

Step S2 is the use of the areas of interest data previously defined by the user in order to determine tiles in the image. This step will be detailed below. The image is divided into rectangular tiles, with the same predetermined size. The width L and height H of a tile are here integer powers of two. It should be noted that other constraints on the size of the tiles are possible in the context of the invention.

As depicted in FIG. 14, the tiles are positioned on the image in accordance with a regular structure. The tiles are positioned as from the top left-hand corner of the image, which then corresponds to the top left-hand corner of a tile.

When the size of the image does not exactly correspond to a whole number of tiles, the tiles on the right and bottom edges of the image are truncated. Such a partitioning of the image is described by the two parameters L and H, which are respectively the width and height of a tile. In an equivalent fashion, the partitioning can be described by two other parameters which represent the parameters L and H. Thus, since the parameters L and H are powers of two, the partitioning can be represented by $\log_2$ (L) and $\log_2$ (H).

Naturally, the partitioning can be effected with tiles of different shapes, or different sizes. For example, it can result from a quadtree decomposition.

Step S2 is followed by the step S3 of coding the image using the previously defined partitioning. The coding includes a quantisation and entropic coding of the samples of the image. The image coding data are stored in the compressed file, in which the image partitioning parameters are also stored.

FIG. 12 depicts an embodiment of step S2 of forming the partitioning of the image as a function of the area of interest data. Step S2 includes sub-steps S20 to S27.

Step S20 is the determination of a width L and height H of a tile. For this purpose, the greatest area of interest width is considered, and the width L chosen is the width which is immediately greater than it.

Likewise, the greatest area of interest height is considered, and the height H chosen is the height which is immediately greater than it.

The following step S21 is a test for determining whether there exists an area of interest through which a tile limit passes. This is because the tiles are formed and positioned as from the top left-hand corner of the image, whilst the areas of interest are positioned freely on the image. Consequently it is possible that an area of interest may have a tile limit passing through it, and consequently shared between two tiles.

If the response is positive, then step S21 is followed by step S22, at which the tile width is increased by a predetermined value. Step S22 is followed by step S23, which is identical to step S21.

If the response is positive at step S23, then step S23 is followed by step S24, at which the tile height is increased by a predetermined value and the tile width is returned to its previous value. Step S24 is followed by step S25, which is identical to step S21.

If the response is positive at step S25, then step S25 is followed by step S26, at which the tile width is once again increased by the predetermined value. Step S26 is followed by step S21.

Thus the width and height of tiles are progressively increased, until no area of interest has a tile limit passing through it. In addition, this method makes it possible to form the smallest possible tiles while taking account of areas of interest, which makes it possible to keep the largest possible number of tiles in the image.

As a variant, the partitioning can also be translated with respect to the image.

When the response is negative at one of steps S21, S23 and S25, then the step in question is followed by the previously described step S3, which effects the coding of the image with the partitioning obtained. Such a partitioning is depicted in FIG. 15. The area of interest is completely included in one of the tiles of the partitioning.

Naturally, the present invention is in no way limited to the embodiments described and depicted, but quite the contrary encompasses any variant within the capability of a person skilled in the art.

The invention claimed is:

1. A method of dividing a digital signal representing physical quantities, comprising the steps of:
   determining at least one area of interest in the signal through an intervention by a user;
   determining an initial partitioning of the signal, including partitioning areas; and
   modifying the partitioning of the signal according to the at least one area of interest and a predetermined criterion so that the at least one area of interest is situated entirely within a partitioning area.

2. The method according to claim 1, in which the partitioning of the signal is modified so that the partitioning areas are the smallest possible in order to satisfy the predetermined criterion.

3. The method according to claim 1, in which the partitioning of the signal includes blocks of samples of the signal, and the modification of the partitioning includes the modification of at least one parameter chosen from amongst a block height and a block width.

4. The method according to claim 1, in which the modification of the partitioning includes a translation of the partitioning with respect to the signal.

5. The method according to claim 1, in which the modification of the partitioning results in a modified partitioning which is selected from a predetermined set of partitionings.

6. A method of coding a digital signal representing physical quantities, including the division method according to claim 1.

7. A device for dividing a digital signal representing physical quantities, comprising:
   means for determining at least one area of interest in the signal responsive to an intervention by a user;
   means for determining an initial partitioning of the signal, including partitioning areas; and
   means for modifying the partitioning of the signal according to the at least one area of interest and a predetermined criterion so that the at least one area of interest is situated entirely within a partitioning area.

8. The device according to claim 7, adapted to modify the partitioning of the signal so that the partitioning areas are as small as possible in order to satisfy the predetermined criterion.

9. The device according to claim 7, in which the means for determining an initial partitioning are adapted to form a partitioning which includes blocks of samples of the signal, and the means for modifying the partitioning are adapted to modify at least one parameter chosen from amongst a block height and a block width.

10. The device according to claim 7, in which the means for modifying the partitioning are adapted to effect a translation of the partitioning with respect to the signal.

11. The device according to claim 7, in which the means for modifying the partitioning are adapted to select a modified partitioning which is in a predetermined set of partitionings.

12. The device according to claim 7, in which the determination and modification means are incorporated in:
  a microprocessor;
  a read only memory containing a program for processing the data; and
  a random access memory containing registers adapted to record variables modified during the running of said program.

13. A device for coding a digital signal representing physical quantities, including the division device according to claim 7.

14. A digital signal processing apparatus, including means adapted to implement the method according to claim 1.

15. A digital signal processing apparatus, including the device according to claim 7.

16. A storage medium storing a program for implementing a method according to claim 1.

17. A computer readable storage medium storing a program for implementing a method of dividing a digital signal representing physical quantities, the method comprising the steps of:
  determining an initial partitioning of the signal;
  displaying a representation of the signal and a representation of the previously determined signal partitioning superimposed onto the representation of the signal;
  acquiring at least one partitioning modification parameter through an intervention by a user;
  modifying the partitioning of the signal in accordance with the at least one partitioning modification parameter; and
  displaying a representation of the modified partitioning,
  in which the storage medium is detachably mountable on a device according to claim 7.

18. The computer readable storage medium according to claim 17, in which the storage medium is a floppy disk or a CD-ROM.

* * * * *

UNITED STATES PATENT AND TRADEMARK OFFICE
CERTIFICATE OF CORRECTION

| | |
|---|---|
| PATENT NO. | : 7,315,648 B2 |
| APPLICATION NO. | : 11/439163 |
| DATED | : January 1, 2008 |
| INVENTOR(S) | : Felix Henry |

It is certified that error appears in the above-identified patent and that said Letters Patent is hereby corrected as shown below:

<u>COLUMN 1</u>

Line 40, "user-chooses" should read --user chooses--.

<u>COLUMN 8</u>

Line 40, "1perameters" should read --parameters--.

Signed and Sealed this

Twenty-sixth Day of August, 2008

JON W. DUDAS
*Director of the United States Patent and Trademark Office*